United States Patent [19]
Ata et al.

[11] Patent Number: 5,374,495
[45] Date of Patent: Dec. 20, 1994

[54] DEVELOPER FOR ELECTROSTATIC ELECTROPHOTOGRAPHY

[75] Inventors: Masafumi Ata; Koichi Kawasumi; Yuji Yakura; Haruo Watanabe, all of Kanagawa, Japan

[73] Assignee: Sony Corporation, Tokyo, Japan

[21] Appl. No.: 963,269

[22] Filed: Oct. 19, 1992

Related U.S. Application Data

[63] Continuation of Ser. No. 633,686, Dec. 26, 1990, abandoned.

[30] Foreign Application Priority Data

Dec. 26, 1989 [JP] Japan .................. 1-337514
Jun. 29, 1990 [JP] Japan .................. 2-172497
Oct. 15, 1990 [JP] Japan .................. 2-275960

[51] Int. Cl.$^5$ .................. G03G 9/087
[52] U.S. Cl. .................. 430/110; 430/109; 430/904
[58] Field of Search .................. 430/96, 110, 115, 109, 430/114, 904

[56] References Cited

U.S. PATENT DOCUMENTS

| | | | |
|---|---|---|---|
| 3,776,723 | 12/1973 | Royka et al. | 965/12 Y |
| 4,564,574 | 1/1986 | Oytterhoeven et al. | 430/115 |
| 4,592,989 | 6/1986 | Smith et al. | 430/110 |
| 4,940,644 | 7/1990 | Matsubara et al. | 430/109 |
| 5,102,763 | 4/1992 | Winnik et al. | 430/110 |

FOREIGN PATENT DOCUMENTS 0198663 10/1986 European Pat. Off. .
0317969 5/1989 European Pat. Off. .
0348844 1/1990 European Pat. Off. .

*Primary Examiner*—Marion E. McCamish
*Assistant Examiner*—Rosemary Ashton
*Attorney, Agent, or Firm*—Hill, Steadman & Simpson

[57] ABSTRACT

A developer for electrostatic electrophotography which comprises a composition of colorant particles, an electric charge supplying agent and a resin binder dispersed in a dispersion medium. The resin binder is a copolymer which has a polyoxyethylene units at side chains thereof, so that the interaction with the electric charge supplying agent is improved. The resultant developer ensures good resolution, gradation and fixing property and is suitable for wet development to give high-quality images. When the copolymer used as the resin binder has styrene units therein, its solubility in the dispersion medium is improved. The developer is either liquid or solid depending on the type of dispersion medium.

11 Claims, 1 Drawing Sheet

DEVELOPER FOR ELECTROSTATIC ELECTROPHOTOGRAPHY

This is a continuation of application Ser. No. 07/633,686, filed Dec. 26, 1990, now abandoned.

BACKGROUND OF THE INVENTION

1. Field of The Invention

This invention relates to a wet developer which is adapted for development of electrostatic latent images such as in electrophotographic processes.

2. Description of The Prior Art

In the field of image formation techniques, systems wherein light is selectively irradiated in a uniformly charged photoconductor according to image signals and the resultant electrostatic latent image is developed are generally called an electrophotographic process. Broadly, the electrophotographic process can be classified into a dry developing process and a wet developing process.

Principally, the dry developing process comprises merely spraying and depositing a colorant powder on an electrostatic latent image and is thus advantageous in good handling properties and good shelf stability. However, as is experienced, for example, in a video printer wherein electronic still photographs are printed, it has now been accepted that the dry developing process is inferior to the wet developing process in order to meet a demand for high-quality images which has been increased in recent years.

The wet developing process is a system wherein a liquid developer dispersing a dye or pigment used as a colorant in an insulating medium is used. According to the wet developing process, it is possible to provide resolution and gradation comparable to those of a silver salt photograph. Especially, where pigments are used as a colorant, the resultant image has good weatherability. This type of system has been extensively developed in various fields.

The developers widely used in the wet developing process are wet developers which make use of an insulating medium which is a liquid at normal temperatures such as, for example, saturated hydrocarbon-based Isoper G (Esso). This type of wet developer is hereinafter referred to as liquid toner.

Moreover, we have already proposed in Japanese Patent Application No. 63-156846 a wet developer wherein colorant particles are dispersed in electrically insulating organic materials which are solid at normal temperature and are capable of liquefaction by heating, so that the problems involved in the liquid toner, e.g. a difficulty in handling, complication in maintenance, and poor shelf life, can be solved. This type of developer is hereinafter referred to as solid toner.

Since the toner is stored as a solid, it is easy to handle with a reduced change in composition. In addition, the toner is molten by means of an appropriate means on used, so that it is possible to effect the wet development like ordinary liquid developers.

In wet developers used in the afore-stated wet developing method, resin ingredients are added either in liquid toners or in solid toners so that they are adsorbed on colorant particles to take an electric charge supplying agent therein. Polymers conventionally used as the resin ingredient are predominantly copolymers of styrene and dodecyl acrylate for the purpose of increasing the solubility in non-polar solvents.

However, such copolymers have so small in number of sites, where metallic ions are taken, that their interaction with an electric charge supplying agent is weak although such interaction is essential for wet developers. In addition, since any polar functional group is not present at the side chain, satisfactory results are not obtained with respect to the adsorption to colorant particles and the fixation to photosensitive films. At present, this disadvantageously leads to unsatisfactory resolving power, gradation and fixation. Especially, with the solid toner, heating is necessary for the development, with a tendency toward the shortage of adsorption of the resin ingredient to the colorant particles. The above disadvantages becomes more pronounced.

With the conventionally employed copolymers, it has to be added in an amount of approximately two to five times the amount of colorant particles, with an attendant problem that when the development is repeated, the composition may be changed and the resin may be fixedly deposited on a developing device.

Studies have been made on the resin ingredient contained in the wet developer, for example, in Japanese Laid-open Patent Application No. 61-156262. However, these studies have been directed mainly to fixation, not to the interaction with electric charge supplying agents and colorant particles as set forth before.

SUMMARY OF THE INVENTION

It is accordingly an object of the invention to provide a developer for electrostatic electrophotography which has an increased interaction between a resin ingredient and an electric charge supplying agent used in wet developers and which is improved in adsorption of the resin ingredient on colorant particles with improved dispersability of the resin ingredient.

It is another object of the invention to provide a developer for electrostatic electrophotography which ensures good charge characteristics of colorant particles along with good resolving power, gradation and fixation.

We have made studies on various copolymers wherein importance is placed on the interaction with electric charge supplying agents and colorant particles and, as a result, found that copolymers having a polyoxyethylene structure at side chains were effective for this purpose.

The above objects can be achieved, according to the invention, by a developer for electrostatic electrophotography which comprises a composition of colorant particles, an electric charge supplying agent and a resin binder dispersed in a dispersion medium, the resin binder being a copolymer which has a polyoxyethylene units at side chains thereof. Preferably, the copolymers are those of acrylate monomers at least one of which has a polyoxyethylene structure at a side chain thereof, or those of at least one acrylate having a polyoxyethylene structure at a side thereof and styrene by which styrene units are contained in the main chain of the copolymer.

The polyoxyethylene structure is made of recurring units of $-O-CH_2CH_2-$ wherein oxygen serves as a coordination site. The polyoxyethylene units should be introduced at side chains of the copolymer. If these units are introduced as a main chain, they cannot be expected as a coordination site.

Styrene units are hydrophobic in nature. When such styrene units are introduced into the copolymer, the polarity of the copolymer is lowered with the dispersability of the resin in non-polar solvents being improved.

DETAILED DESCRIPTION AND EMBODIMENTS OF THE INVENTION

Figure 1:
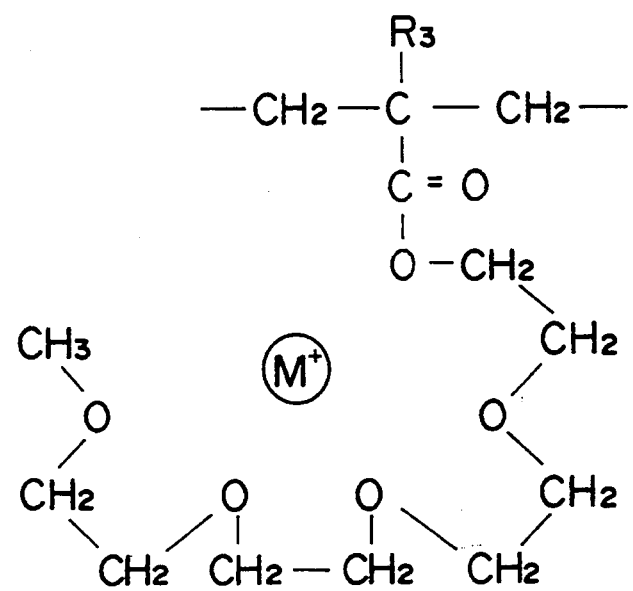
FIG. 1 is a schematic view showing the state of a polyoxyethylene structure in which metallic ions are taken up.

The developer of the invention comprises a dispersion, medium, colorant particles, a resin binder and an electric charge supplying agent. These ingredients are first described.

The resin binders may be any copolymer which has a polyoxyethylene structure at side chains. Taking into consideration the compatibility with a dispersion medium and the formation of coordination sites with functional groups such as a carboxyl group, acrylate copolymers having recurring units of the following formulas (I) and (II) are preferred

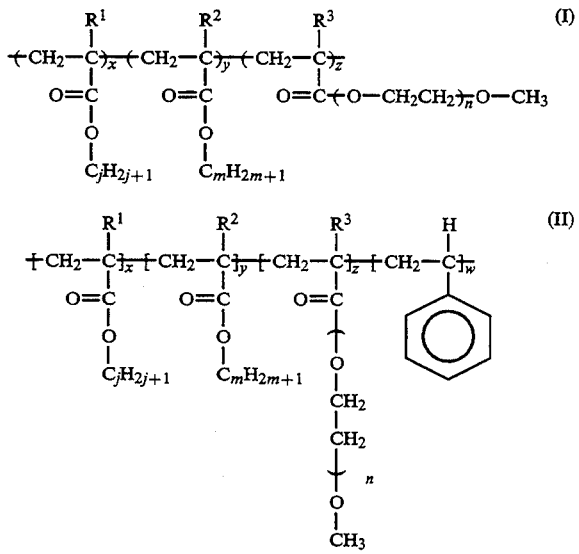

wherein each $R^1$, each $R^2$ and each $R^3$ independently represent hydrogen or a methyl group, j is an integer of from 1 to 3 and m is an integer of from 10 to 30 provided that the values of each of j and m may be different within the defined range for the respective recurring units, and x, y, z and w are ratios of the respective monomers and are defined such that x is in the range of from 0 to 0.8, y is in the range of 0.2 to 0.9999, z is in the range of from 0.0001 to 0.05 and w is in the range of from 0.1 to 0.8. Preferably, x is in the range of from 0.2 to 0.8 and z is in the range of from 0.001 to 0.05. If the value of x is outside the above range, the coordination sites of the ester bonds are reduced in number, leading to a difficulty in taking up the electric charge supplying agent therein. Similarly, when the value of y is outside the above-defined range, there arises the problem with respect to the solubility in the dispersion medium. If the value of z is less than 0.0001, the effect of introducing the polyoxyethylene structure becomes poor, whereas over 0.05, the solubility is lowered. When the value of w is less than 0.1, a satisfactory effect of introducing the styrene units is not expected. Over 0.8, the solubility is lowered.

The n for the number of recurring units in the polyoxyethylene structure is preferably in the range of from 2 to 23. If n is too great in number, the resultant copolymer becomes difficult to dissolve in non-polar solvents. Lower values results in an improvement of the solubility, but the action as the functional group is reduced.

The molecular weight of the copolymer is preferably in the range of from 3000 to 100,000 in terms of number average molecular weight, Mn. More preferably, the molecular weight is in the range of from 5000 to 50,000.

The wet developer according to the invention comprises, aside from the resin ingredient, a dispersion medium, an electric charge supplying agent and colorant particles. In addition, charge improvers may be further added.

The dispersion medium may be either liquid or solid at normal temperatures provided that it is electrically insulative in nature and is an organic matter and that it should be liquefied upon development.

The liquid, electrically insulative organic materials include, for example, aliphatic hydrocarbons, alicyclic hydrocarbons, aromatic hydrocarbons, halogenated hydrocarbons, polysiloxanes and the like. In view of the volatility, safety, toxicity and odor, iso-paraffin petroleum solvents are preferably used. Examples of the iso-paraffin petroleum solvent include Isoper G, Isoper H, Isoper L and Isoper K (products of Esso), and Shellsol 71 (product of Shell Petroleum Co., Ltd.).

With the solid, electrically insulative organic materials, their melting point should preferably be not lower than 30° C., more preferably not lower than 40° C., in consideration of normal service conditions and handling properties. The upper limit of the melting point is not critical and is preferably approximately 100° C., more preferably 80° C. The reason for this is that if the melting point is too higher, additional heating energy is necessary and that when used on a substrate, the melting point should not exceed a heat-resistant temperature of a material ordinarily employed as the substrate.

The materials satisfying the above requirements include paraffins, waxes and mixtures thereof. The paraffins include various normal paraffins having from 16 to 60 carbon atoms such as nonadecane to hexacontane. The waxes include plant waxes such as carnauba wax, cotton wax and the like, animal waxes such as beeswax, ozokerite, and petroleum waxes such as paraffin waxes, microcrystalline waxes, petrolactams and the like. These materials are dielectric materials having a dielectric constant of from 1.9 to 2.3.

Moreover, there may be further used crystalline polymers having long alkyl groups at side chains such as polyethylene, polyacrylamide, acrylic homopolymers or copolymers such as poly-n-stearyl acrylate, poly-n-stearyl methacrylate, n-stearyl acrylate-ethyl methacrylate copolymers and the like. In view of the viscosity on heating, paraffins and waxes are preferred.

The colorant particles dispersed in the dispersion medium may be any known colorants such as inorganic pigments, organic pigments, dyes and mixtures thereof.

Examples of the inorganic pigments include chromium pigments, cadmium pigments, iron pigments, cobalt pigment, ultramarine blue pigments, iron blue pigments and the like. Examples of the organic pigments and dyes include Hansa yellow (C.I. 11680), benzidine yellow (C.I. 21110), fast red (C.I. 37085), brilliant carmine 3B (C.I. 16015-Lake), phthalocyanine blue (C.I. 74160), Victoria Blue (C.I. 42595-Lake), spirit black (C.I. 50415), oil blue (C.I. 74350), alkali blue (C.I. 42770A), fast scarlet (C.I. 12315), rhodamine 6B (C.I. 45160), rhodamine lake (C.I. 45160-Lake), fast sky blue (C.I. 74200-Lake), nigrosine (C.I. 50415), carbon black and the like. These may be used singly or in combination and are used by selecting one which has a desired color.

Aside from the resin ingredient having a polyoxyethylene structure at side chains, there may be used in combination known resin materials. Examples of the resin materials include rubbers such as butadiene, rubber, styrene-butadiene rubber, cyclized rubber, natural rubber and the like, synthetic resins such as styrene resins, vinyl toluene resins, acrylic resins, polycarbonate resins, polyvinyl acetate resins and the like, and natural resins such as rosin-based resins, hydrogenated rosin-based resins, alkyd resins including modified alkyds such as linseed oil-modified alkyd resins, polyterpenes and the like. Aside, there may further be used phenolic resins, modified phenolic resins such as phenol-formalin resins, pentaerythritol phthalate, cumarone-indene resins, ester gum resins, plant oil-polyamide resins and the like. In addition, there may also be used halogenated hydrocarbon polymers such as polyvinyl chloride, chlorinated polypropylene and the like, synthetic rubbers such as vinyl toluene-butadiene rubbers, butadiene-isoprene rubber and the like, polymers of acrylic monomers having a long alkyl group such as 2-ethylhexyl methacrylate, lauryl methacrylate, stearyl methacrylate, lauryl acrylate, acetyl acrylate and the like, and copolymers of these monomers with copolymerizable monomers such as, for example, styrene-lauryl methacrylate copolymers, acrylic acid-lauryl methacrylate copolymers and the like, polyolefins such as polyethylene, polyterpenes, and the like.

In general, the wet developer further comprises electric charge supplying agents. Usable agents include, for example, metal salts of fatty acids such as naphthenic acid, octenic acid, oleic acid, stearic acid, iso-stearic acid, lauric acid and the like, metals salts such as of sulfosuccinic acid esters, oil-soluble metal salts of sulfonic acid, phosphate metal salts, metal salts of abietic acid, metals salts of aromatic acids, metals salts of aromatic sulfonic acids, and the like.

In order to improve the chargeability of the colorant particles, charge improvers such as metal oxide particles such as $SiO_2$, $Al_2O_3$, $TiO_2$, $ZnO$, $Ga_2O_3$, $In_2O_3$, $GEO_2$, $SnO_2$, $PbO_2$, $MgO$ and mixtures thereof may be added.

These ingredients are formulated as follows. The colorant particles are preferably used in an amount of from 0.1 to 100 g, more preferably from 0.1 to 10 g, per liter of the dispersion medium. In order to carry out the development in an efficient manner and reduce the amount of a waste toner, the concentration relative to the dispersion medium (ratio of the dispersion medium and the colorant) should preferably in the range of from 2 to 10 wt %.

The concentration range of the colorant is a concentration used at the developing step. During storage, the concentration may be higher.

The resin ingredient is added in an amount not higher than that of the colorant particles. More particularly, the amount is preferably in the range of from 0.01 to 100 g, more preferably from 0.1 to 10 g, per liter of the dispersion medium as in the case of the colorant particles.

Likewise, the electric charge supplying agent is preferably used in an amount of from 0.001 to 10 g, preferably from 0.01 to 1 g, per liter of the dispersion medium. The charge improver is added in amounts of not larger than two times the amount of the colorant particles on the weight basis and more preferably, the amount is equal to or less than the amount of the colorant particles.

For the preparation of the wet developer according to the invention, a kneading aid such as oleic acid may be added for adsorption on colorant particles in order to facilitate the resin ingredient to be adsorbed on the colorant particles.

As described before, the copolymer having a polyoxyethylene structure which is used as the resin ingredient in the wet developer of the invention is excellent not only in adsorption on colorant particles, but also in the interaction with an electric charge supplying agent. This is considered as follows: as shown in FIG. 1, the polyoxyethylene chain provided at the side chain of a copolymer behaves as a crown ether, so that a metal ion of the charge supplying agent is surrounded with the coordination site formed by the polyoxyethylene chain.

Figure 2:
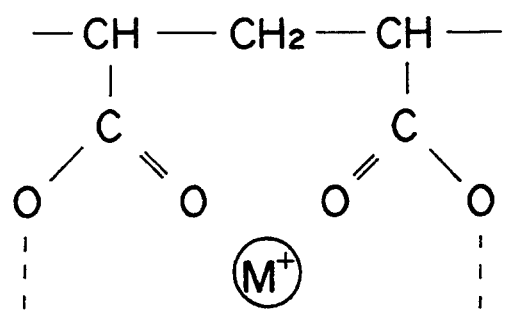
FIG. 2 is a schematic view showing the state of an ester bond in which metallic ions are taken up.

When the copolymer has an ester bond derived from an acrylic monomer, the coordination site is also formed by the oxygen atoms of the carboxyl groups, with which a metal ion is surrounded as is particularly shown in FIG. 2.

In the wet developer of the invention, the interaction with a charge supplying agent is ensured by means of the coordination site of the resin ingredient, thereby improving charge characteristics of the colorant particles. As described before, the incorporation of styrene units in the copolymer results in a lowering of polarity of the resin ingredient. This is advantageous in that high dispersability or dispersion stability of the resin ingredient in a dispersion medium is ensured irrespective of the fact that the toner is liquid or solid.

The present invention is described in more detail by way of examples.

Synthetic Example 1 of Resins

An acrylic monomer was weighed to which 0.5 of a polymerization initiator, AIBN, [$\alpha$, $\alpha'$-azobis-(isobutyronitrile)] was added on the basis of the weight of the monomer. After addition of a solvent (dimethylformamide) in an amount of five times by volume the monomer, followed by evacuation through a vacuum line and sealing a reaction tube. After reaction at 70° C. for 18 hours, the reaction tube was opened, to which a reaction terminator (hydroquinone) was added, followed by precipitation three times from an n-hexane-ethanol mixed solvent for purification. The solvent was completely removed, to which toluene was added in an amount equal to that of a prepared resin. Thus, the resin was dispersed and stored.

According to the procedure described above, resins indicated in Table 1 were prepared. These resins were prepared from methyl acrylate, stearyl acrylate, and methoxytetraethylene glycol methacrylate (or methoxydiethylene glycol methacrylate). In the formula (I) indicated before, J=1 and m=18.

Synthetic Example 2 of Resins

Two types of acrylate monomers indicated hereinafter and styrene were weighed, to which 0.5% of a polymerization initiator [$\alpha$, $\alpha'$-azobis-(isobutyronitrile)] was added on the basis of the weight of the monomers. After addition of a solvent (dimethylformamide) in an amount of five times by volume the monomers, followed by bubbling by the use of dry nitrogen and sealing in an atmosphere of nitrogen. After reaction at 70° C. for about 24 hours, the reaction tube was opened, followed by precipitation two times from an n-hexane-ethanol mixed solvent for purification. The solvent was completely removed, to which toluene was added in an amount equal to that of a prepared resin and dispersed for storage.

According to the above preparation procedure, copolymers A and B indicated in Table 2 were prepared. These copolymers A and B were prepared from stearyl acrylate (m=18 in the foregoing formula (1), methoxytetraethylene glycol methacrylate (n=4) and styrene.

In the above Synthetic Examples 1 and 2, the methyl acrylate was used to improve flexibility of the resin and stearyl acrylate was used to improve solubility in paraffin solvents.

TABLE 1

|       | x    | y    | z    | n  |
|-------|------|------|------|----|
| AD1-1 | 0.75 | 0.20 | 0.05 | 2  |
| AD1-2 | 0.79 | 0.20 | 0.01 | 2  |
| AD2-1 | 0.75 | 0.20 | 0.05 | 4  |
| AD2-2 | 0.79 | 0.20 | 0.01 | 4  |
| YD3-1 | 0.59 | 0.40 | 0.01 | 9  |
| YD4-1 | 0.59 | 0.40 | 0.01 | 23 |
| AS1-1 | 0.8  | 0.2  | 0    | 0  |

In Table 1, the resin AS1-1 has not any polyoxyethylene structure and is for comparison.

In Examples, resin FR101 was used for comparison, which is a copolymer of styrene and dodecyl acrylate (available from Mitsubishi Rayon Co., Ltd.).

TABLE 2

|             | y    | z    | w    | x |
|-------------|------|------|------|---|
| Copolymer A | 0.20 | 0.01 | 0.79 | 0 |
| Copolymer B | 0.50 | 0.01 | 0.49 | 0 |

It will be noted that the copolymer A has such a weight average molecular weight, Mw, and a number average molecular weight, Mn, that Mw=37300 and Mn=24600. The copolymer B has such a weight average molecular weight, Mw, and a number average molecular weight, Mn, that Mw=33500 and Mn=23800.

Example 1

A developer of the following formulation was prepared.

| Kneading aid (oleic acid)   | 0.60 g    |
| Pigment (colorant particles)| 0.50 g    |
| Zirconium octylate          | one drop  |
| Calcium octylate            | one drop  |
| Resin (AD2-2)               | 0.25 g    |
| Isoper H                    | 50 ml     |

These ingredients were placed in a container along with glass beads and dispersed sufficient by means of a paint shaker.

For comparison, developers were prepared in the same manner as set forth above, except that resin AS1-1 and resin FR1-1 were used, respectively.

The thus prepared developers were subjected to electrophoretic analyses to compare them with respect to the total charge, excess ion charge and pigment charge. For this purpose, each toner stock solution was diluted to 1:10. The total charge and the excess ion charge were, respectively, calculated as amounts of charge per ml of the stock developer, and the pigment charge was calculated as an amount of charge per g of the pigment. The results are shown in Table 3.

TABLE 3

| Resin  | Total Charge ($\times 10^{-6}$ C/ml) | Excess Ion Charge ($\times 10^{-6}$ C/ml) | Pigment Charge ($\times 10^{-4}$ C/g) |
|--------|--------|--------|--------|
| AD2-2  | 289.50 | 218.32 | 77.34  |
| FR101  | 13.61  | 13.33  | 0.29   |
| AS1-1  | 19.13  | 15.80  | 3.78   |

As will be apparent from Table 3, the charge of the pigment is improved by about 25 times greater than that of the developer using known FR101 when only 1% of methoxytetraethylene glycol methacrylate is copolymerized.

Example 2

In the same manner as in Example 1 using AD2-1 as the resin, a developer was prepared and subjected to measurement of electric charge.

As a result, it was found that the total charge was $244.36\times 10^{-6}$ C/ml, the excess ion charge was $178.39\times 10^{-6}$ C/ml, and the charge of the pigment was $69.08\times 10^{-4}$ C/g. With the AD2-1 resin, the surface charge of the pigment was improved by about 250 times greater than in the case using the known FR101.

Example 3

In the same manner as in Example 1 using AD1-2 as the resin, a developer was prepared and subjected to measurement of electric charge.

As a result, it was found that the total charge was $60.76\times 10^{-6}$ C/ml, the excess ion charge was $45.14\times 10^{-6}$ C/ml, and the charge of the pigment was $16.52\times 10^{-4}$ C/g. With the AD2-1 resin, the surface charge of the pigment was improved by about 59 times greater than in the case using the known FR101.

Example 4

In the same manner as in Example 1 using AD1-1 as the resin, a developer was prepared and subjected to measurement of electric charge.

As a result, it was found that the total charge was $56.86\times 10^{-6}$ C/ml, the excess ion charge was $39.06\times 10^{-6}$ C/ml, and the charge of the pigment was $18.82\times 10^{-4}$ C/g. With the AD1-1 resin, the surface charge of the pigment was improved by about 50 times greater than in the case using the known FR101.

Example 5

Developers were prepared in the same manner as in Example 1 except that the kneading aid used was 0.50 g of an iso-paraffin solvent (IP 2835 available from Idemitsu Petrochemical Co., Ltd.) and the resin used was AD2-2, AS1-1 and FR101, followed by measurement of charges. The results are shown in Table 4 below.

TABLE 4

| Resin  | Total Charge ($\times 10^{-6}$ C/ml) | Excess Ion Charge ($\times 10^{-6}$ C/ml) | Pigment Charge ($\times 10^{-4}$ C/g) |
|--------|--------|-------|--------|
| AD2-2  | 204.86 | 86.37 | 132.66 |
| FR101  | 30.24  | 28.51 | 1.83   |
| AS1-1  | 28.13  | 27.40 | 0.86   |

The surface charge of the pigment was improved by about 70 times greater than that of the developer using the known FR101.

Example 6

In the same manner as in Example 5 using AD2-1 as the resin, a developer was prepared and subjected to measurement of electric charge.

As a result, it was found that the total charge was $241.75 \times 10^{-6}$ C/ml, the excess ion charge was $176.22 \times 10^{-6}$ C/ml, and the charge of the pigment was $68.19 \times 10^{-4}$ C/g. The surface charge of the pigment was improved by about 40 times greater than in the case using the known FR101.

Example 7

In the same manner as in Example 5 using AD1-2 as the resin, a developer was prepared and subjected to measurement of electric charge.

As a result, it was found that the total charge was $15.19 \times 10^{-6}$ C/ml, the excess ion charge was $6.94 \times 10^{-6}$ C/ml, and the charge of the pigment was $9.45 \times 10^{-4}$ C/g. The surface charge of the pigment was improved by about 5 times greater than in the case using the known FR101.

Example 8

In the same manner as in Example 5 using AD1-1 as the resin, a developer was prepared and subjected to measurement of electric charge.

As a result, it was found that the total charge was $34.29 \times 10^{-6}$ C/ml, the excess ion charge was $15.63 \times 10^{-6}$ C/ml, and the charge of the pigment was $20.89 \times 10^{-4}$ C/g. The surface charge of the pigment was improved by about 10 times greater than in the case using the known FR101.

Example 9

Developers were prepared as formulated in the same manner as in Example 1 except that the solvent used was paraffin, followed by measurement of electric charges. It will be noted that the paraffin was solid at normal temperatures and the measurement of the charges was made in a conditions where the paraffin was melted at 50° C. The results are shown in Table 5 below.

TABLE 5

| Resin | Total Charge ($\times 10^{-6}$ C/ml) | Excess Ion Charge ($\times 10^{-6}$ C/ml) | Pigment Charge ($\times 10^{-4}$ C/g) |
|---|---|---|---|
| AD2-2 | 280.11 | 222.5 | 63.37 |
| FR101 | 10.01 | 9.73 | 0.31 |
| AS1-1 | 18.50 | 14.40 | 4.51 |

In the case using paraffin as the dispersion medium, the surface charge of the pigment was improved by not less than 200 times that of the developer using FR101. By the incorporation of the polyoxyethylene structure only in an amount of 1%, the charge was improved by not less than 10 times greater. In this connection, the surface charge is slightly lower than that attained at room temperature by Isoper as the dispersion medium. This is considered due to the tendency of the resin to separate from the pigment surfaces owing to thermal vibrations.

Example 10

The same composition as in Example 2 was used except that paraffin was used as the dispersion medium.

As a result, it was found that the total charge was $220.54 \times 10^{-6}$ C/ml, the excess ion charge was $159.00 \times 10^{-6}$ C/ml, and the charge of the pigment was $67.69 \times 10^{-4}$ C/g. The surface charge of the pigment was improved by about 200 times greater than in the case using the known FR101.

Example 11

The same composition as in Example 3 was used except that paraffin was used as the dispersion medium.

As a result, it was found that the total charge was $53.86 \times 10^{-6}$ C/ml, the excess ion charge was $40.32 \times 10^{-6}$ C/ml, and the charge of the pigment was $14.55 \times 10^{-4}$ C/g. The surface charge of the pigment was improved by about 40 times greater than in the case using the known FR101.

The resin used had a polyoxyethylene structure at side chains which was smaller than those of AD2-1 and AD2-2. Accordingly, the polyoxyethylene structure should have a certain length so as to cause charged to be taken up therein.

Example 12

The same composition as in Example 4 was used except that paraffin was used as the dispersion medium.

As a result, it was found that the total charge was $50.04 \times 10^{-6}$ C/ml, the excess ion charge was $40.88 \times 10^{-6}$ C/ml, and the charge of the pigment was $9.90 \times 10^{-4}$ C/g. The surface charge of the pigment was improved by about 30 times or greater than in the case using the known FR101.

Example 13

The same composition as in Example 5 was used except that paraffin was used as the dispersion medium.

As a result, it was found that the total charge was $199.50 \times 10^{-6}$ C/ml, the excess ion charge was $88.50 \times 10^{-6}$ C/ml, and the charge of the pigment was $11.98 \times 10^{-4}$ C/g. It will be noted the difference from Example 9 resides only in the type of kneading aid and the kneading aid used was IP2835.

Example 14

The same composition as in Example 6 was used except that paraffin was used as the dispersion medium.

As a result, it was found that the total charge was $200.75 \times 10^{-6}$ C/ml, the excess ion charge was $153.30 \times 10^{-6}$ C/ml, and the charge of the pigment was $52.19 \times 10^{-4}$ C/g.

In this example, AD-21 and IP2835 as the kneading aid were used.

Example 15

The same composition as in Example 7 was used except that paraffin was used as the dispersion medium.

As a result, it was found that the total charge was $13.44 \times 10^{-6}$ C/ml, the excess ion charge was $9.01 \times 10^{-6}$ C/ml, and the charge of the pigment was $4.87 \times 10^{-4}$ C/g.

In this case, the surface charge was not improved so significantly. As the kneading aid, oleic acid used in Example 11 was better than IP2835 used in this example.

Example 16

The same composition as in Example 8 was used except that paraffin was used as the dispersion medium.

As a result, it was found that the total charge was $20.11 \times 10^{-6}$ C/ml, the excess ion charge was $8.85 \times 10^{-6}$ C/ml, and the charge of the pigment was $12.38 \times 10^{-4}$ C/g.

In this case, the surface charge is not improved so far but is improved significantly over the case using FR101.

Then, the developers prepared for the measurement of the charges were used to conduct development. For the development, the developer solutions of Examples 1 to 8 were applied at normal temperatures but the developers of Examples 9 to 16 using paraffin as the dispersion medium were applied at temperatures ranging from 45° to 75° C.

Development Example 1

Developing characteristics of the developers using Isoper H as the dispersion medium are shown in Table 6.

TABLE 6

|  | Resolution (lines/mm) | Fixing Property | Gradation |
| --- | --- | --- | --- |
| Example 1 | 50 | very good | very good |
| Example 2 | 50 | very good | very good |
| Example 3 | 40 | good | good |
| Example 4 | 40 | good | good |
| Example 5 | 50 | very good | very good |
| Example 6 | 50 | very good | very good |
| Example 7 | 40 | good | good |
| Example 8 | 40 | good | good |

The resolution of the composition using FR101 was about 33 lines/mm. The developers of the examples are very good with respect to the resolution. With the case using FR101, the fixing property was so poor that the pigment was fallen off when rubbed slightly. In contrast, the fixing property is significantly improved when using the developers of the invention. In addition, the developing intensity by absorbance is about 3 times or greater than that of the case using FR101.

Development Example 2

The developing characteristics at 45° C. of the developers using paraffin as the dispersion medium are shown in Table 7.

TABLE 7

|  | Resolution (lines/mm) | Fixing Property | Gradation |
| --- | --- | --- | --- |
| Example 9 | 50 | very good | very good |
| Example 10 | 50 | very good | very good |
| Example 11 | 40 | good | good |
| Example 12 | 40 | good | good |
| Example 13 | 50 | very good | very good |
| Example 14 | 50 | very good | very good |
| Example 15 | 40 | good | good |
| Example 16 | 40 | good | good |

In the case where paraffin was used as the dispersion medium, similar characteristics as in the development with the developers using Isoper at room temperature could be obtained.

Development Example 3

The developing characteristics at 55° C. of the developers using paraffin as the dispersion medium are shown in Table 8.

TABLE 8

|  | Resolution (lines/mm) | Fixing Property | Gradation |
| --- | --- | --- | --- |
| Example 9 | 50 | very good | very good |
| Example 10 | 50 | very good | very good |
| Example 11 | 35 | good | good |
| Example 12 | 35 | good | good |
| Example 13 | 40 | very good | very good |
| Example 14 | 40 | very good | very good |
| Example 15 | 35 | good | good |
| Example 16 | 35 | good | good |

Development Example 4

The developing characteristics at 65° C. of the developers using paraffin as the dispersion medium are shown in Table 9.

TABLE 9

|  | Resolution (lines/mm) | Fixing Property | Gradation |
| --- | --- | --- | --- |
| Example 9 | 40 | good | good |
| Example 10 | 40 | good | good |
| Example 11 | 35 | moderate | good |
| Example 12 | 35 | moderate | good |
| Example 13 | 40 | good | good |
| Example 14 | 40 | good | good |
| Example 15 | 35 | good | good |
| Example 16 | 35 | good | good |

Development Example 5

The developing characteristics at 75° C. of the developers using paraffin as the dispersion medium are shown in Table 10.

TABLE 10

|  | Resolution (lines/mm) | Fixing Property | Gradation |
| --- | --- | --- | --- |
| Example 9 | 40 | good | good |
| Example 10 | 40 | good | good |
| Example 11 | 35 | moderate | moderate |
| Example 12 | 35 | moderate | moderate |
| Example 13 | 40 | good | good |
| Example 14 | 40 | good | good |
| Example 15 | 35 | moderate | moderate |
| Example 16 | 35 | moderate | moderate |

At high temperatures, particularly, higher than 65° C., inclusive, the developers using FR101 scarcely allow the toner to be fixed. This is considered for the reason that with FR101, the resin and the toner are separated from each other at high temperatures by thermal vibrations. In contrast, with the developers of the invention, the developing density slightly lowers but a satisfactory development is possible even at 75° C. with a good resolution.

Synthetic Example 3 of Resins

In the same manner as in Synthetic Example 1, resins having a long polyoxyethylene chain were prepared. The values, x, y, z, n, the weight average molecular weight, Mw, and the number average molecular weight, Mn, of the prepared resins are shown in Table 11.

TABLE 11

|   | YD3-1 | YD4-1 |
|---|---|---|
| x | 0.59 | 0.59 |
| y | 0.40 | 0.40 |
| z | 0.01 | 0.01 |
| n | 9 | 23 |
| Mw | 61,200 | 52,300 |
| Mn | 21,600 | 20,500 |

Example 17

|   |   |
|---|---|
| Magenta Lake pigment | 0.8 g |
| Resin (YD3-1) | 0.5 g |
| Iso-paraffin solvent | 0.6 g |

The above composition was kneaded according to the Hoover Automatic Muller method.

Subsequently, 50 ml of Isoper H which was an iso-paraffin solvent, and several drops of a charge supplying agent were added, followed by agitation for several hours by means of a paint shaker for sufficient dispersion.

The resultant magenta toner was used for development at high temperatures. A high resolution of not less than 50 lines/mm and good dispersability in the nonpolar solvent were achieved along with good gradation, transparency and fixing property.

Example 18

A magenta toner was prepared in the same manner as in Example 17 except that paraffin (melting point of 42° to 44° C.) was used instead of Isoper H.

The magenta toner was used for development at high temperatures, with similar results as in Example 17.

Example 19

A magenta toner was prepared in the same manner as in Example 17 except that resin (YD4-1) was used instead of the resin (YD3-1).

The magenta toner was used for development at high temperatures. As a result, a high resolution of not less than 50 lines/mm and high dispersability in the non-polar solvent were achieved along with good gradation, transparency and fixing property.

Example 20

A magenta toner was prepared in the same manner as in Example 19 except that paraffin (melting point of 42° to 44° C.) was used instead of Isoper H.

The magenta toner was used for development at high temperatures, with similar results as in Example 19.

Example 21

The copolymer A prepared in the same manner as described before was used as the resin ingredient to prepare a yellow liquid developer.

More particularly, about 0.5 g of benzidine yellow G and about 0.5 g of the copolymer A were dispersed in about 0.5 g of an iso-paraffin petroleum solvent (IP2835 available from Idemitsu Petroleum Co., Ltd.) and kneaded, followed by finely dividing according to the Hoover Automatic Muller method.

Thereafter, 50 ml of Isoper H (Esso) and several microliters to several tens microliters of zirconium octylate used as an electric charge supplying agent were added, followed by agitation for several hours to obtain a developer.

Example 22

The general procedure of Example 21 was repeated except that the copolymer B was used instead of the copolymer A, thereby obtaining a developer.

The developers obtained in Examples 21 and 22 were used for development at high temperatures in order to evaluate developing characteristics.

As a result, although the yellow pigment which is considered to be worst in dispersability and to be difficult in development was used, a high resolution of not less than 50 lines/mm could be obtained along with good dispersability of the toner, gradation, transparency and fixing property. Especially, the developer of example 22 is improved over that of example 21 with respect to the dispersability and has good storage stability.

When there were used, instead of Isoper H, solid paraffins having a melting point of from 40° to 80° C., there were obtained solid developers showing similar good developing characteristics.

What is claimed is:

1. A developer for electrostatic electrophotography which comprises a composition of colorant particles, an electric charge supplying agent and a resin binder dispersed in a solid dispersion medium, wherein the solid dispersion medium is selected from the group consisting of paraffins, waxes and mixtures thereof, and the resin binder is a copolymer which has polyoxyethylene side chains connected to the copolymer backbone through a carbonyl group.

2. A developer according to claim 1, wherein said copolymer is a copolymer of acrylate monomers at least one of which has a polyoxyethylene structure at a side chain thereof.

3. A developer according to claim 2, wherein said copolymer has recurring units of the following formula (I)

$$\begin{array}{ccc} R^1 & R^2 & R^3 \\ | & | & | \\ (CH_2-C)_x(CH_2-C)_y(CH_2-C)_z \\ | & | & | \\ O=C & O=C & O=C(O-CH_2CH_2)_n O-CH_3 \\ | & | & \\ O & O & \\ | & | & \\ C_jH_{2j+1} & C_mH_{2m+1} & \end{array} \quad (I)$$

wherein each $R^1$, each $R^2$ and each $R^3$ independently represent hydrogen or a methyl group, j is an integer of from 1 to 3 and m is an integer of from 10 to 30 provided that the values of each of j and m may be different within the respective defined range for the respective recurring units, and x, y and z are defined such that x is in the range of from 0 to 0.8, y is in the range of 0.2 to 0.9999 and z is in the range of from 0.0001 to 0.05, and n is an integer of from 2 to 23.

4. A developer according to claim 1, wherein said copolymer is a copolymer of at least one acrylate having a polyoxyethylene structure at a side chain thereof and styrene whereby styrene units are contained in the main chain of the copolymer.

5. A developer according to claim 4, wherein said copolymer has recurring units of the following formula (II)

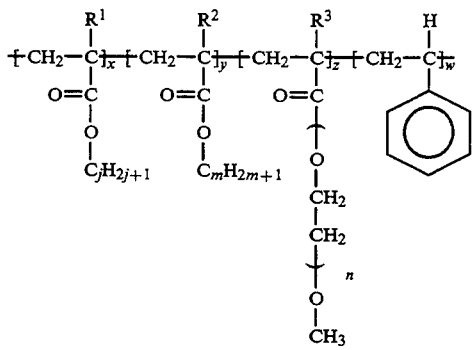

(II)

wherein each $R^1$, each $R^2$ and each $R^3$ independently represent hydrogen or a methyl group, j is an integer of from 1 to 3 and m is an integer of from 10 to 30 provided that the values of each of j and m may be different within the respective defined range for the respective recurring units, and x, y, z and w are defined such that x is in the range of from 0 to 0.8, y is in the range of 0.2 to 0.9999, z is in the range of from 0.0001 to 0.05 and w is in the range of from 0.1 to 0.8, and n is an integer of from 2 to 23.

6. A developer according to claim 1, wherein said dispersion medium is an electrically insulative material having a melting point of not lower than 30° C.

7. A developer according to claim 1, wherein said electric charge supplying agent is a member selected from metal salts of fatty acids, metal salts of sulfosuccinic acid esters, oil-soluble metal salts of sulfonic acid, metal salts of phosphoric esters, metal salts of abietic acid, metal salts of aromatic carboxylic acids and metal salts of aromatic sulfonic acids.

8. A developer according to claim 1, wherein said resin binder is used in an amount of 0.01 to 100 g, said colorant particles are used in an amount of from 0.01 to 100 g, and said electric supplying agent is used in an amount of from 0.001 to 10 g each per liter of said dispersion medium.

9. A developer according to claim 8, wherein the amounts of said resin binder, said colorant particles and said electric charge supplying agent are, respectively, from 0.1 to 10 g, from 0.1 to 10 g, and from 0.01 to 1 g, each per liter of said dispersion medium, respectively.

10. A developer according to claim 1, further comprising at least one resin other than said resin binder.

11. A developer according to claim 1, further comprising metal oxide particles used as a charge improver.

* * * * *